(12) United States Patent
Wirth et al.

(10) Patent No.: US 11,566,916 B2
(45) Date of Patent: Jan. 31, 2023

(54) SENSOR ASSEMBLY FOR A VEHICLE

(71) Applicant: Robert Bosch GmbH, Stuttgart (DE)

(72) Inventors: Jens Wirth, Abstatt (DE); Martin Koegel, Bad Berka (DE)

(73) Assignee: Robert Bosch GmbH, Stuttgart (DE)

( * ) Notice: Subject to any disclaimer, the term of this patent is extended or adjusted under 35 U.S.C. 154(b) by 320 days.

(21) Appl. No.: 17/041,951

(22) PCT Filed: Mar. 25, 2019

(86) PCT No.: PCT/EP2019/057399
§ 371 (c)(1),
(2) Date: Sep. 25, 2020

(87) PCT Pub. No.: WO2019/185523
PCT Pub. Date: Oct. 3, 2019

(65) Prior Publication Data
US 2021/0131825 A1 May 6, 2021

(30) Foreign Application Priority Data
Mar. 27, 2018 (DE) ...................... 10 2018 204 599.2

(51) Int. Cl.
*G01D 3/08* (2006.01)
*G01P 3/44* (2006.01)
*H02J 1/10* (2006.01)

(52) U.S. Cl.
CPC .................. *G01D 3/08* (2013.01); *G01P 3/44* (2013.01); *H02J 1/108* (2013.01)

(58) Field of Classification Search
CPC ....................................................... G01D 3/08
(Continued)

(56) References Cited

U.S. PATENT DOCUMENTS

2005/0035656 A1   2/2005   Kuramochi et al.

FOREIGN PATENT DOCUMENTS

DE   198 14 097 C1   3/2000
DE   100 62 839 A1   1/2002
(Continued)

OTHER PUBLICATIONS

Reinhard. Machine Translation of DE1981409. Published Mar. 2000. Translated Sep. 2022. (Year: 2000).*

(Continued)

*Primary Examiner* — Walter L Lindsay, Jr.
*Assistant Examiner* — Philipmarcus T Fadul
(74) *Attorney, Agent, or Firm* — Maginot, Moore & Beck LLP

(57) ABSTRACT

A sensor assembly for a vehicle includes a sensor element and at least two control devices, each having an evaluation and control unit and a power source. A first evaluation and control unit is connected to a first power source in a first control device, and a second evaluation and control unit is connected to a second power source in a second control device. The first control device comprises a switching device which connects a first connection of the sensor element to the first power source and/or to the second power source. A second connection of the sensor element is connected to the second control device. A sensor current flowing through the sensor element is modulated with information relating to a detected measurement variable. The first evaluation and control unit evaluates the sensor current detected between the connected power source and the sensor element.

20 Claims, 4 Drawing Sheets

(58) Field of Classification Search
USPC .......................................................... 73/1.37
See application file for complete search history.

(56) References Cited

FOREIGN PATENT DOCUMENTS

| | | |
|---|---|---|
| DE | 100 41 989 A1 | 3/2002 |
| DE | 10 2013 209 488 A1 | 11/2014 |
| DE | 10 2014 208 391 A1 | 11/2015 |
| DE | 10 2015 202 335 A1 | 8/2016 |
| JP | 2004-338577 A | 12/2004 |

OTHER PUBLICATIONS

International Search Report corresponding to PCT Application No. PCT/EP2019/057399, dated Jul. 18, 2019 (German and English language document) (6 pages).

* cited by examiner

SENSOR ASSEMBLY FOR A VEHICLE

This application is a 35 U.S.C. § 371 National Stage Application of PCT/EP2019/057399, filed on Mar. 25, 2019, which claims the benefit of priority to Serial No. DE 10 2018 204 599.2, filed on Mar. 27, 2018 in Germany, the disclosures of which are incorporated herein by reference in their entirety.

The disclosure is based on a sensor arrangement for a vehicle.

BACKGROUND

Sensor arrangements for vehicles each having a wheel sensor with at least one sensor element for each vehicle wheel are known from the prior art. The individual wheel sensors are generally connected, via a two-core twisted cable, to a control device for a vehicle braking system which carries out, for example, ABS, ESP, ASR and/or hill-hold functions (ABS: anti-lock braking system, ESP: electronic stability program, ASR: anti-slip regulation). A first connection of the at least one sensor element is usually connected to an energy source via the control device (high-side path) and a second connection of the at least one sensor element is connected to ground via the control device (low-side path). A sensor current flowing through the at least one sensor element is modulated with information relating to the speed and/or rotational speed of the corresponding vehicle wheel, wherein an evaluation and control unit of the control device evaluates the sensor current captured between the at least one sensor element and ground.

DE 10 2015 202 335 A1 discloses a sensor housing for a wheel sensor apparatus, a wheel sensor apparatus, a wheel bearing apparatus and a method for forming a sensor system suitable for determining a speed and/or a rotational speed of a wheel of a vehicle. The wheel sensor apparatus comprises a first sensor element which can be used to provide at least one evaluation and/or control apparatus of the vehicle with at least one first sensor variable with respect to a speed and/or a rotational speed of the wheel, and an additional, second sensor element which can be used to provide the at least one evaluation and/or control apparatus with at least one second sensor variable with respect to the speed and/or the rotational speed of the same wheel.

SUMMARY

The sensor arrangement for a vehicle has the advantage that a sensor signal from the respective sensor element is available via a tap between energy source and sensor element (high-side path) within a first control device and via a tap between the sensor element and ground (low-side path) in a second control device and thus can be evaluated simultaneously by two evaluation and control units. In addition, the voltage supply of the individual sensor elements can be changed over between two energy sources, with the result that, if a first energy source fails, it is possible to automatically change over to a second energy source. Using only one simple sensor element for each measurement point, the sensor signal from which is redundantly evaluated by two control devices, results in a considerable cost reduction, with approximately the same redundant evaluation reliability, in comparison with the use of two sensor elements for each measurement point, since sensor signals from all measurement points are evaluated in the two control devices and the failure probability of the sensor elements is low.

Embodiments of the present disclosure provide a sensor arrangement for a vehicle, having a sensor element and at least two control devices each having an evaluation and control unit and an energy source. In this case, a first evaluation and control unit is connected to a first energy source in a first control device and a second evaluation and control unit is connected to a second energy source in a second control device. The first control device comprises a changeover apparatus which connects a first connection of the sensor element to the first energy source and/or to the second energy source. In addition, a second connection of the sensor element is connected to the second control device. A sensor current flowing through the sensor element is modulated with information relating to a captured measurement variable, wherein the first evaluation and control unit evaluates the sensor current captured between the connected energy source and the sensor element and the second evaluation and control unit evaluates the sensor current captured between the sensor element and ground. Furthermore, if the connected energy source fails, the changeover apparatus connects the first connection of the sensor element to the other energy source.

Embodiments of the sensor arrangement according to the disclosure can generally comprise a plurality of sensor elements which are arranged in a distributed manner in the vehicle at a respective measurement point. Embodiments of the present sensor arrangement can therefore preferably be used in a vehicle braking system. In such a braking system, the measurement points may be each assigned to a vehicle wheel, for example, wherein a corresponding sensor element can capture at least a speed and/or rotational speed of the assigned vehicle wheel. It goes without saying that other measurement variables, for example temperature, pressure etc., can also be captured at such a measurement point.

In the present case, the evaluation and control unit can be understood as meaning an electrical circuit which processes or evaluates captured sensor signals. The evaluation and control unit may have at least one interface which may be designed using hardware and/or software. In the case of a hardware design, the interfaces may be, for example, part of a so-called system ASIC which comprises a wide variety of functions of the evaluation and control unit. However, it is also possible for the interfaces to be separate, integrated circuits or to at least partially consist of discrete components. In the case of a software design, the interfaces may be software modules which are present, in addition to other software modules, on a microcontroller, for example. A computer program product having program code, which is stored on a machine-readable carrier such as a semiconductor memory, a hard disk memory or an optical memory and is used to carry out the evaluation when the program is executed by the evaluation and control unit, is also advantageous.

In the present case, the control device can be understood as meaning an electrical device, for example a brake control device, which, in conjunction with a hydraulic braking system, can carry out various braking functions, for example ABS, ESP, ASR and/or hill-hold functions (ABS: anti-lock braking system, ESP: electronic stability program, ASR: anti-slip regulation). In this case, the two control devices can carry out different braking functions during normal operation. If one of the control devices fails, provision may be made for the other control device to assume the braking functions of the failed control device.

In the present case, a sensor element is understood as meaning an electrical component which directly or indirectly captures a physical variable or a change in a physical variable in the region of an assigned vehicle wheel and preferably converts it into an electrical sensor signal. This can be carried out, for example, by emitting and/or receiving sound and/or electromagnetic waves and/or via a magnetic field or the change in a magnetic field. Optical sensor elements having, for example, a photo plate and/or a fluorescent surface and/or a semiconductor, which detect the impingement or the intensity, the wavelength, the frequency, the angle etc. of the received wave, for example infrared sensor elements, are possible. An acoustic sensor element is likewise conceivable, for example an ultrasonic sensor element and/or a high-frequency sensor element and/or a radar sensor element and/or a sensor element which reacts to a magnetic field, for example a Hall sensor element and/or a magnetoresistive sensor element and/or an inductive sensor element which registers the change in a magnetic field via the voltage produced by magnetic induction, for example.

Advantageous improvements of the sensor arrangement for a vehicle are possible by virtue of the measures and developments cited in the dependent claims.

It is particularly advantageous that the changeover apparatus can comprise, at least for each connected sensor element, two diodes with a common node to which a supply voltage for the sensor element connected to the common node can be applied. In this case, a first diode can connect the first energy source in the forward direction to the common node, and a second diode can connect the second energy source in the forward direction to the common node, with the result that a supply voltage which is fed from the first and/or the second energy source can be applied to the common node, wherein the higher voltage prevails. At the expense of a higher voltage drop, this enables a simple and cost-effective implementation of the changeover apparatus which can automatically change over between the voltage sources without an actuation signal.

Alternatively, the changeover apparatus can comprise, at least for each connected sensor element, two switching elements with a common node to which a supply voltage for the sensor element connected to the common node can be applied. In this case, a first actuation unit can actuate a first switching element which connects the common node to the first energy source, and a second actuation unit can actuate a second switching element which connects the common node to the second energy source. In this embodiment, it is possible to stipulate which of the energy sources is preferably used to supply the connected sensor elements. In addition, if field effect transistors are used as switching elements, the voltage drop in the sensor current path can be reduced. For example, the first actuation unit can actuate the first switching element and can connect the common node to the first energy source if a first voltage detection means detects that the first energy source provides a first voltage. In addition, the second actuation unit can actuate the second switching element and can connect the common node to the second energy source if a second voltage detection means detects that the second energy source provides a second voltage and a priority circuit enables the actuation of the second switching element. The priority circuit can enable the actuation of the second switching element if the first voltage detection means detects that the first energy source does not provide a voltage.

In a further advantageous configuration of the sensor arrangement, a current processing means can be arranged in the first control device and can capture the respective sensor current between the connected energy source and the respective sensor element and can make it available to the first evaluation and control unit as a respective measurement current. In this case, the second evaluation and control unit can receive and evaluate the respective sensor current directly as a second measurement current. As a result, the circuit is adjusted only within the first control device, which adjustment makes the sensor current of the sensor elements available to the first evaluation and control unit.

In a further advantageous configuration of the sensor arrangement, the current processing means can comprise, at least for each connected sensor element, a current sensor which is looped into the current path and branches off a fraction of the respective sensor current and forwards it to the first evaluation and control unit. In addition, the current sensor forwards the sensor current to the associated sensor element. As a result, the sensor current which flows into the first connection of the associated sensor element is measured and an equivalent but considerably smaller fraction of the sensor current is forwarded to the first evaluation and control unit. This makes it possible to reduce the power loss in the first control device.

In a further advantageous configuration of the sensor arrangement, the first evaluation and control unit can have, at least for each connected sensor element, an input protective circuit which converts the fraction of the respective sensor current into a measurement signal corresponding to the respective sensor current. A voltage representing the respective sensor current can be generated as a measurement signal, for example. In this embodiment, the input protective circuit may comprise, for example, a non-reactive resistor with a higher resistance value which produces a voltage value from the reduced measurement current, said voltage value representing the sensor current. As a result, no changes to the downstream evaluation circuit or downstream evaluation method are required.

Alternatively, the current processing means can comprise, at least for each connected sensor element, a current conditioning means which is arranged between the respective current sensor and the first evaluation and control unit and converts the fraction of the respective sensor current into an associated measurement current corresponding to the respective sensor current. In this embodiment, no changes to the first evaluation and control unit are required.

In a further advantageous configuration of the sensor arrangement, the current processing means can comprise a first auxiliary voltage generation means with an energy store which outputs, at a summation point, a first auxiliary voltage which is lower than the supply voltages of the energy sources. In addition, the summation point can be connected to the sensor current paths of the connected sensor elements between the respective changeover apparatus and the respective current sensor in order to charge the energy store. The first auxiliary voltage may be approximately 1 V lower than the supply voltages of the energy sources, for example. The summation point can be respectively connected to the sensor current paths of the connected sensor elements via a feedback protective diode and a current source, for example. Furthermore, the current processing means can comprise a second auxiliary voltage generation means which may be in the form of a DC/DC converter and can convert the first auxiliary voltage into a considerably lower, second auxiliary voltage. This second auxiliary voltage can preferably supply the current conditioning means. As a result, the current conditioning means acts as a loadable energy source which is fed by means of the first auxiliary voltage source. In order to keep the power loss low overall, this auxiliary voltage source has a voltage of approximately 2.5 V to 3 V. The energy of this first auxiliary voltage source is advantageously produced from the supply voltage from the first or second energy source which is applied to the first input of the connected sensor elements.

In a further advantageous configuration of the sensor arrangement, the current processing means can comprise an emergency voltage generation means which, if the supply voltage is missing, can supply a connected sensor element with a third auxiliary voltage which is generated from the sensor current paths of the other connected sensor elements. The emergency voltage generation means is effective when both supply voltages fail in a sensor element. The emergency voltage generation means can comprise, for example, a DC/DC converter which converts the second auxiliary voltage of approximately 2.5 V to 3 V into the higher, third auxiliary voltage of approximately 8 V, a switching apparatus and a feedback protective diode, wherein the switching apparatus connects the third auxiliary voltage to the affected sensor current path.

In a further advantageous configuration of the sensor arrangement, the current processing means and the changeover apparatus can be combined in one circuit module which can preferably be in the form of an ASIC module.

In a further advantageous configuration of the sensor arrangement, the individual sensor elements can be respectively connected to the first control device via a two-wire line. In addition, the at least two control devices can be connected to one another via a multi-core line which, for each of the sensor elements connected to the first control device, comprises a core for transmitting the respective sensor current and a core for connecting the changeover apparatus to the second energy source.

Exemplary embodiments of the disclosure are illustrated in the drawing and are explained in more detail in the following description. In the drawing, identical reference signs denote components or elements which perform identical or similar functions.

DETAILED DESCRIPTION

Figure 1:
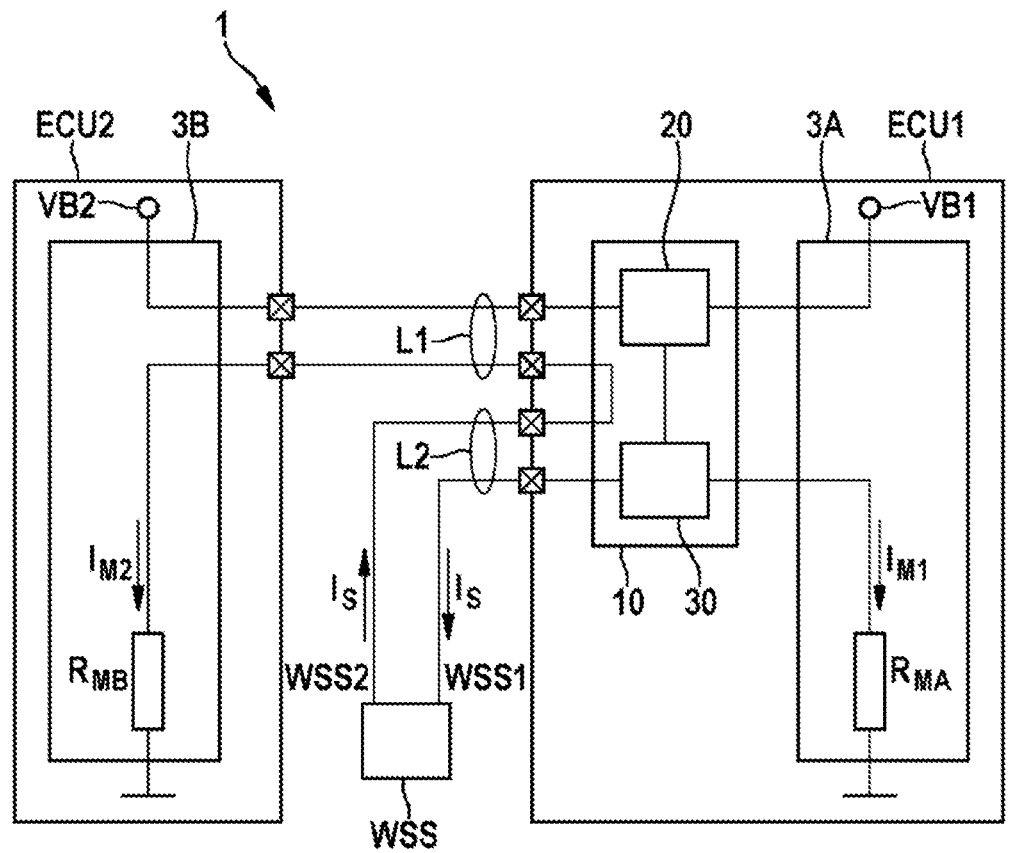
FIG. 1 shows a schematic block diagram of an exemplary embodiment of a sensor arrangement according to the disclosure for a vehicle.

As is clear from FIG. 1, the illustrated exemplary embodiment of a sensor arrangement 1 according to the disclosure for a vehicle comprises a sensor element WSS and at least two control devices ECU1, ECU2 each having an evaluation and control unit 3A, 3B and an energy source VB1, VB2. As is also clear from FIG. 1, a first evaluation and control unit 3A is connected to a first energy source VB1 in a first control device ECU1. A second evaluation and control unit 3B is connected to a second energy source VB2 in a second control device ECU2. In this case, the first control device ECU1 comprises a changeover apparatus 20 which connects a first connection WSS1 of the sensor element WSS to the first energy source VB1 and/or to the second energy source VB2. A second connection WSS2 of the sensor element WSS is connected to the second control device ECU2. In addition, a sensor current $I_s$ flowing through the respective sensor element WSS is modulated with information relating to a captured measurement variable, wherein the first evaluation and control unit 3A evaluates the sensor current Is captured between the connected energy source VB1, VB2 and the sensor element WSS and the second evaluation and control unit 3B evaluates the sensor current Is captured between the sensor element WSS and ground. This means that the first evaluation and control unit 3A evaluates the sensor current Is captured in the high-side path and the second evaluation and control unit 3B evaluates the sensor current Is captured in the low-side path. If the connected energy source VB1, VB2 fails, the changeover apparatus 20 connects the first connection WSS1 of the sensor element WSS to the other energy source VB2, VB1. This means that, if the connected first energy source VB1 fails, the changeover apparatus 20 changes over to the second energy source VB2 and, if the connected second energy source VB2 fails, changes over to the first energy source VB1.

Embodiments of the sensor arrangement 1 according to the disclosure for a vehicle generally comprise a plurality of measurement points each with such a sensor element WSS. For reasons of clarity, only one of the sensor elements WSS is illustrated in FIG. 1. Embodiments of the present sensor arrangement 1 are thus preferably used in a vehicle braking system. In such a braking system, the measurement points can each be assigned to a vehicle wheel, for example, wherein the sensor elements WSS can capture at least a speed and/or rotational speed of the corresponding vehicle wheel. In a normal automobile having four wheels, the sensor arrangement 1 therefore has four sensor elements WSS of this type. It goes without saying that other measurement variables, for example temperature, pressure etc., can be captured at such a measurement point.

In this case, the second connections WSS2 of the sensor elements WSS can be connected to ground directly or via interposed components.

Figure 2:
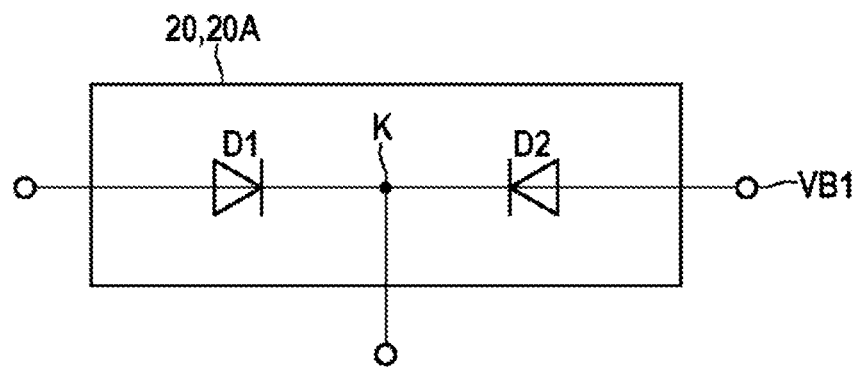
FIG. 2 shows a schematic block diagram of a first exemplary embodiment of a changeover apparatus of the sensor arrangement according to the disclosure for a vehicle from FIG. 1.

As is clear from FIG. 2, the changeover apparatus 20A in the illustrated first exemplary embodiment comprises, at least for each connected sensor element WSS, two diodes D1, D2 with a common node K to which a supply voltage for the sensor element WSS connected to the common node K is applied. In this case, a first diode D1 connects the first energy source VB1 in the forward direction to the common node K. A second diode D2 connects the second energy source VB2 in the forward direction to the common node K. As a result, a supply voltage which is fed from the first and/or the second energy source VB1, VB2 is applied to the common node K, wherein the higher voltage prevails. This means that, if the first energy source VB1 fails, the node K is fed from the second energy source VB2 and vice versa. If both channels are completely symmetrical, the node K is fed by both energy sources VB1, VB2 in equal parts.

Figure 3:
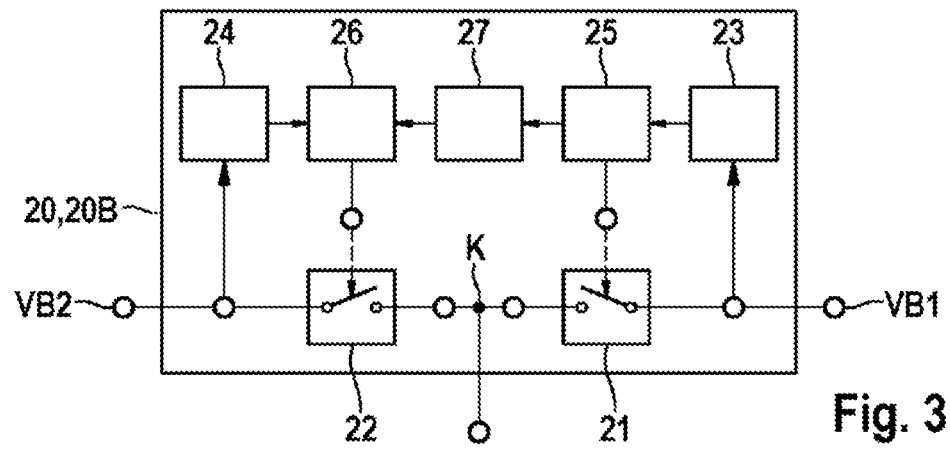
FIG. 3 shows a schematic block diagram of a second exemplary embodiment of the changeover apparatus of the sensor arrangement according to the disclosure for a vehicle from FIG. 1.

As is also clear from FIG. 3, the changeover apparatus 20B in the illustrated second exemplary embodiment comprises, at least for each connected sensor element WSS, two switching elements 21, 22, which are preferably in the form of field effect transistors, with a common node K to which a supply voltage for the sensor element WSS connected to the common node K is applied. As is also clear from FIG. 3, a first actuation unit 25 actuates a first switching element 21 which connects the common node K to the first energy source VB1. A second actuation unit 26 actuates a second switching element 22 which connects the common node K to the second energy source VB2. As is also clear from FIG. 3, a first voltage detection means 23 detects whether the first energy source VB1 provides a first voltage. A second voltage detection means 24 detects whether the second energy source VB2 provides a second voltage. In addition, the changeover apparatus 20B comprises a priority circuit 27 which, in the illustrated second exemplary embodiment, gives priority to the first energy source VB1 over the second energy source. In an alternative exemplary embodiment which is not illustrated, the priority circuit 27 can give priority to the second energy source VB2 over the first energy source VB1. The first actuation unit 25 actuates the first switching element 21 and connects the common node K to the first energy source VB1 if the first voltage detection means 23 detects that the first energy source VB1 provides the first voltage. The second actuation unit 26 actuates the second switching element 22 and connects the common node K to the second energy source VB2 if the second voltage detection means 24 detects that the second energy source VB2 provides the second voltage and the priority circuit 27 enables the actuation of the second switching element 22. In the illustrated second exemplary embodiment, the priority circuit 27 enables the actuation of the second switching element 22 if the first voltage detection means 23 detects that the first energy source VB1 does not provide a voltage. As a result of the priority circuit 27, the second energy source VB2 can be connected more quickly to the common node K since the priority circuit 27 switches through only an actuation signal generated by the second actuation circuit 26 to the second switching element 22.

As is also clear from FIG. 1, a current processing means is arranged in the first control device ECU1 and captures the respective sensor current $I_S$ between the connected energy source VB1, VB2 and the respective sensor element WSS and makes it available to the first evaluation and control unit 3A as a respective measurement current $I_{M1}$. The second connection WSS2 of the respective sensor element WSS is connected to ground via a measurement resistor $R_{MB}$ in the second control device ECU2. As a result, the second evaluation and control unit 3B captures the respective sensor current $I_S$ in the low-side path directly as a second measurement current $I_{M2}$ and evaluates the latter.

Various exemplary embodiments of the current processing means 30 are described below with reference to FIGS. 4 to 6. As is clear from FIGS. 4 to 6, the current processing means 30 comprises, at least for each connected sensor element WSS, a current sensor 32 which is looped into the current path and branches off a fraction $I_S/n$ of the respective sensor current $I_S$ and forwards it to the first evaluation and control unit 3A. In addition, the current sensor 32 passes the sensor current $I_S$ to the first connection WSS1 of the associated sensor element WSS.

Figure 4:
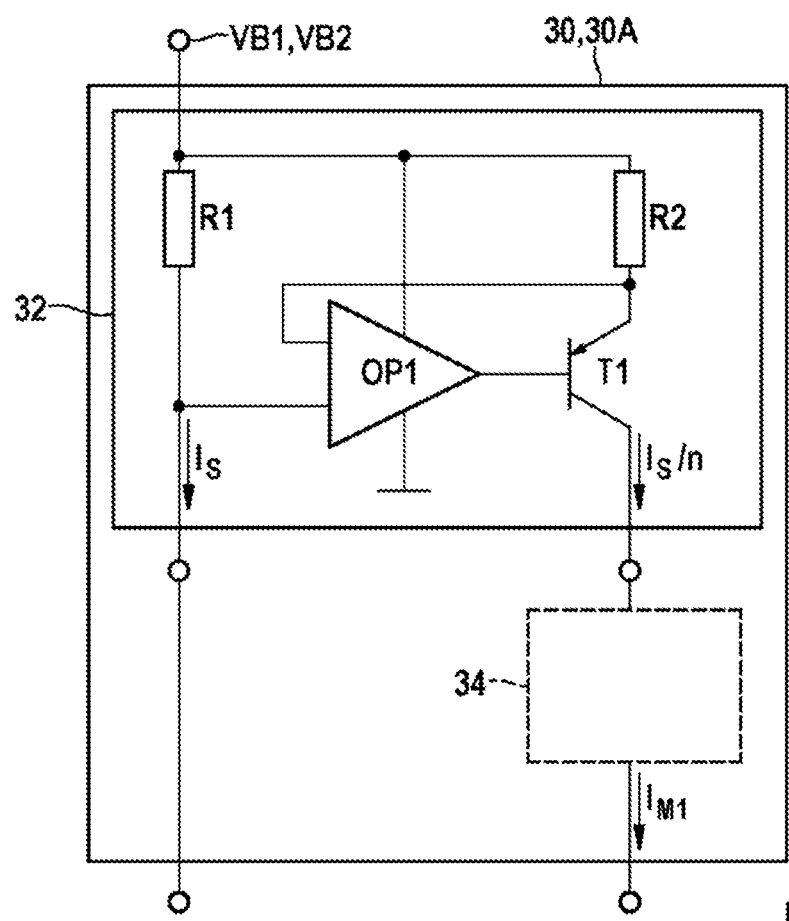
FIG. 4 shows a schematic block diagram of a first exemplary embodiment of a current processing means of the sensor arrangement according to the disclosure for a vehicle from FIG. 1.

As is also clear from FIG. 4, the current sensor 32 in the illustrated exemplary embodiment comprises two non-reactive resistors R1, R2, an operational amplifier OP' and a transistor T1. Said electrical components are connected to one another as illustrated, with the result that the current sensor 32 in the high-side path of the first control device ECU1 causes a low voltage drop in contrast to a simple current mirror circuit. The sensor current $I_S$ which flows into the first connection WSS' of the sensor element WSS is measured by the current sensor and an equivalent, but considerably smaller current $I_S/n$ is supplied to the first evaluation and control unit 3A in order to reduce the power loss in the first control device ECU'. When branching off the additional fraction $I_S/n$ of the sensor current $I_S$, it should be noted that the energy sources VB1, VB2 are able to provide this additional fraction $I_S/n$ of the sensor current $I_S$. An overall current $(I_S/n+I_S)$ which is drawn from the connected energy source VB1, VB2 should not exceed a predefined maximum value of 50 mA, for example. In the case of a v protocol, the sensor current $I_S$ has values of mA/14 mA/28 mA. These values can be considerably reduced by means of the current sensor 32. A value of 50, for example, can be selected for n. In order to generate the corresponding measurement signals for the v protocol for the evaluation in the first evaluation and control unit 3A, an input protective circuit having the first evaluation and control unit 3A at least for each connected sensor element WSS can be accordingly adapted in order to convert the fraction $I_S/n$ of the respective sensor current $I_S$ into a measurement signal corresponding to the respective sensor current $I_S$. For example, a first measurement resistance $R_{M4}$ of approximately 10 ohms can be increased by the factor n, which corresponds here to the value 50, to approximately 500 ohms in order to be able to directly process the fraction $I_S/n$ of the respective sensor current $I_S$ from the current sensor 32. As a result, the overall effort needed to adapt the first control device ECU' can be considerably reduced since a downstream current conditioning means 34 for providing the first measurement current $I_{M1}$, which is illustrated only with dashed lines in FIG. 4, could be dispensed with.

Figure 5:
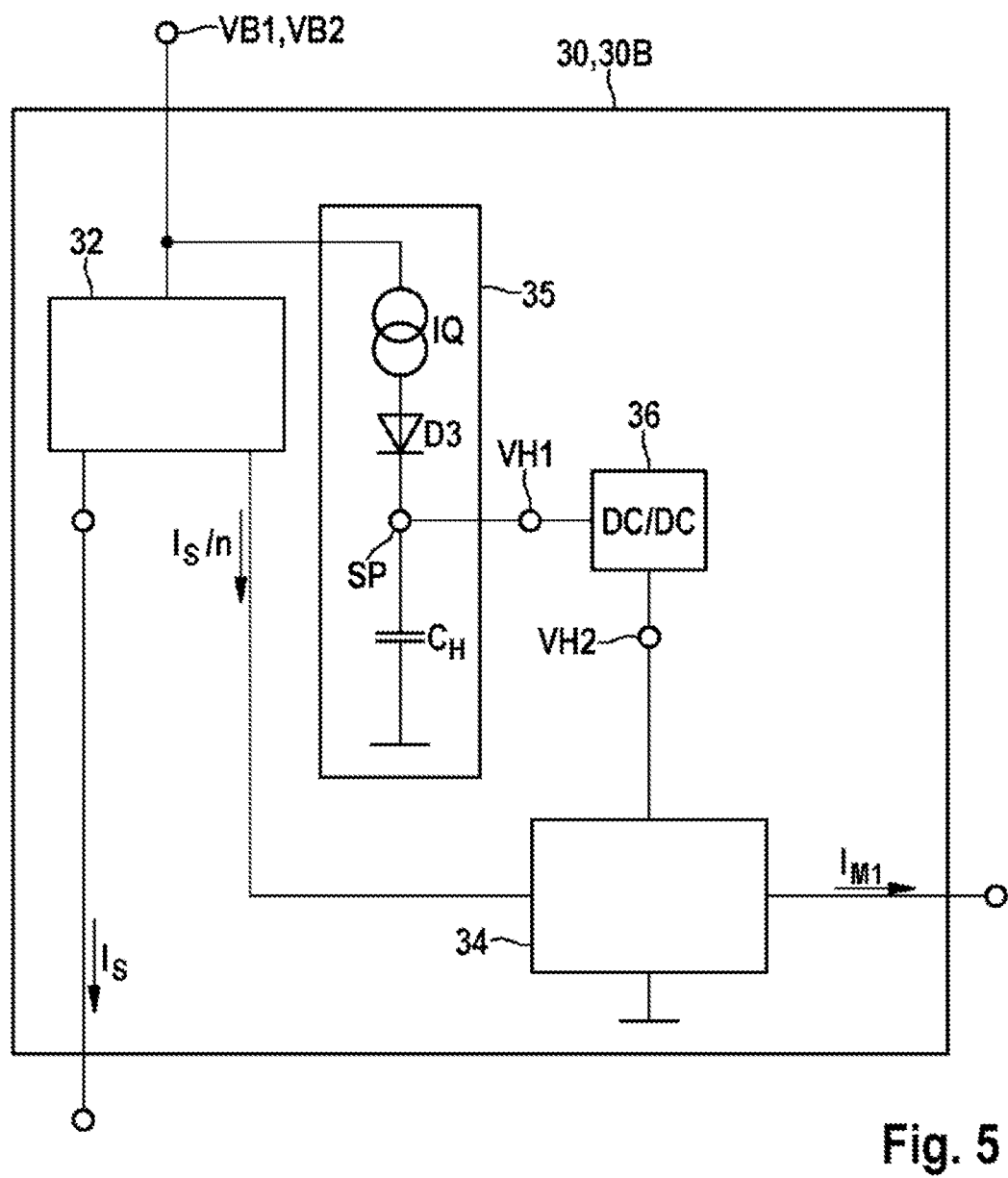
FIG. 5 shows a schematic block diagram of a second exemplary embodiment of the current processing means of the sensor arrangement according to the disclosure for a vehicle from FIG. 1.
Figure 6:
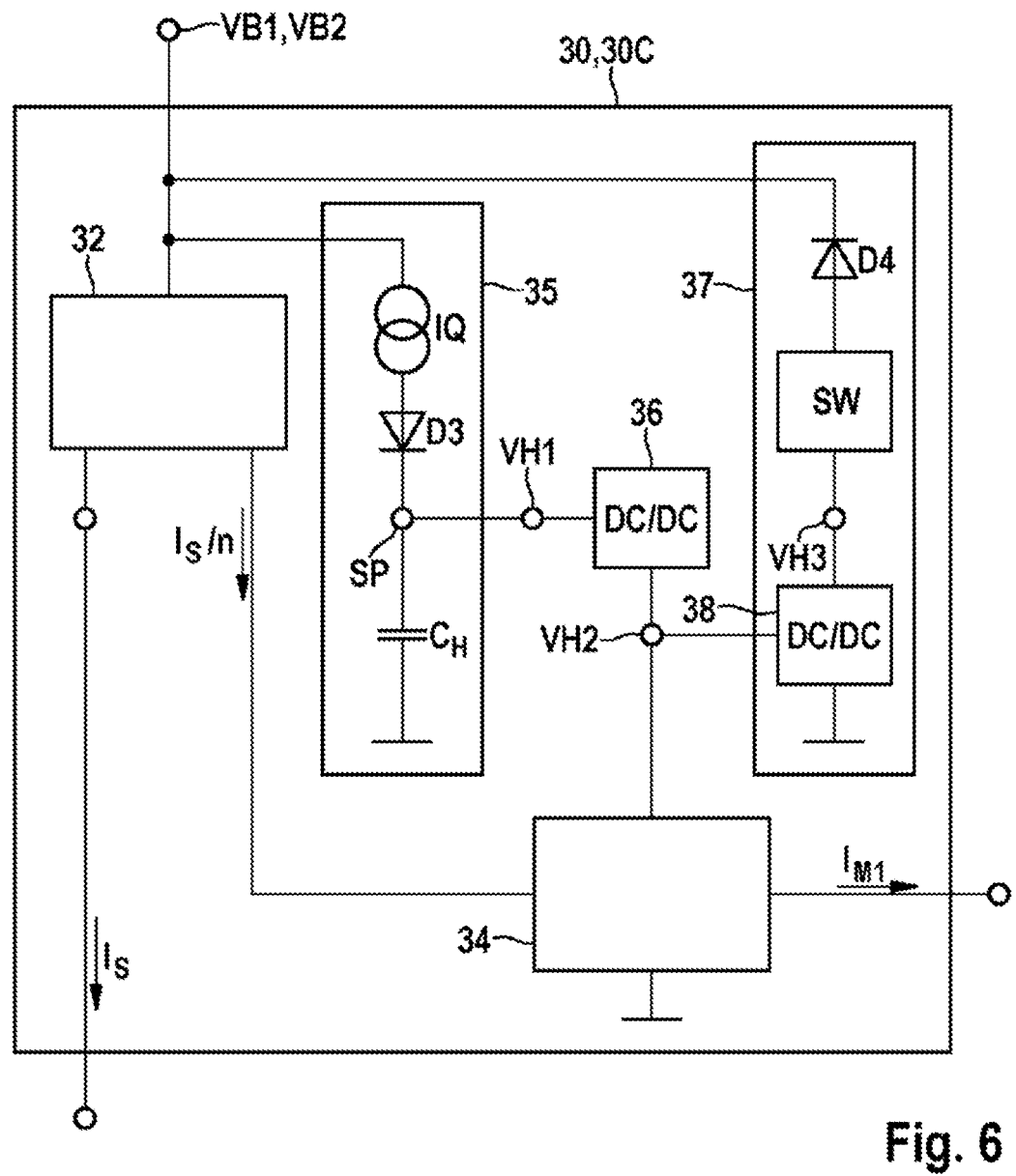
FIG. 6 shows a schematic block diagram of a third exemplary embodiment of the current processing means of the sensor arrangement according to the disclosure for a vehicle from FIG. 1.

As is clear from FIGS. 5 and 6, the current processing means 30 in the illustrated exemplary embodiments comprises, at least for each connected sensor element WSS, a current conditioning means 34 which is arranged between the respective current sensor 32 and the first evaluation and control unit 3A. The current conditioning means 34 is in the form of a loadable energy source and converts the fraction $I_S/n$ of the respective sensor current $I_S$ into an associated first measurement current $I_{M1}$ corresponding to the respective sensor current $I_S$. As is also clear from FIGS. 5 and 6, the current processing means 30 comprises a first auxiliary voltage generation means 35 having an energy store $C_H$ which outputs a first auxiliary voltage VH1 at a summation point SP. The first auxiliary voltage VH1 is approximately 1 V lower than the supply voltages of the energy sources VB1, VB2 which each have a value of approximately 12 V, for example. The summation point SP is connected to the sensor current paths of the connected sensor elements WSS between the respective changeover apparatus 20 and the respective current sensor 32 in order to charge the energy store $C_H$. In the illustrated exemplary embodiments, the summation point SP is respectively connected to the sensor current paths of the connected sensor elements WSS via a feedback protective diode D3 and a current source IQ. In addition, the current processing means 30 comprises a second auxiliary voltage generation means 36 which is in the form of a DC/DC converter and converts the first auxiliary voltage VH1 into a considerably lower, second auxiliary voltage VH2 of 2.5 V to 3 V, for example, in order to keep the power loss low overall. The second auxiliary voltage generation means 36 supplies the current conditioning means 34 with the second auxiliary voltage VH2.

As is also clear from FIG. 6, the current processing means 30 in the illustrated exemplary embodiment comprises an emergency voltage generation means 37 which, if the supply voltage is missing, supplies a connected sensor element WSS with a third auxiliary voltage VH3 of approximately 8 V which is generated from the sensor current paths of the other connected sensor elements WSS. The emergency voltage generation means 37 comprises in the illustrated exemplary embodiment a DC/DC converter 38 which converts the second auxiliary voltage VH2 into the higher, third auxiliary voltage VH3, a switching apparatus SW and a feedback protective diode D4. The switching apparatus SW connects the third auxiliary voltage VH3 to the affected sensor current path, with the result that the third auxiliary voltage VH3 supplies the associated sensor element WSS.

The current processing means 30 and the changeover apparatus 20 are preferably combined in one circuit module 10 which is preferably in the form of an ASIC module. The individual sensor elements WSS are respectively connected to the first control device ECU1 via a two-wire line L2. This results in a simplified wiring complexity. The two control devices ECU1, ECU2 are connected to one another via a multi-core line L1 which, for each of the sensor elements WSS connected to the first control device ECU', comprises a core for transmitting the respective sensor current $I_S$ and a core for connecting the changeover apparatus 20 to the second energy source VB2.

Embodiments of the present invention disclosure provide a sensor arrangement for a vehicle, in which a simple sensor element known from the prior art is simultaneously used by two control devices, wherein a control device, here the second control device, having an evaluation and control unit known from the prior art can be used. The circuit needs to be adjusted only within the first control device.

The invention claimed is:

1. A sensor arrangement comprising:
a sensor element, and
at least a first control device and a second control device each having an evaluation and control unit and an energy source, wherein a first evaluation and control unit of the first control device is connected to a first energy source in the first control device, and a second evaluation and control unit of the second control device is connected to a second energy source in the second control device; and
wherein the first control device comprises a changeover apparatus configured to connect a first connection of the sensor element to the first energy source and/or to the second energy source,
wherein a second connection of the sensor element is connected to the second control device,
wherein the sensor element is configured to modulate a sensor current flowing through the sensor element with information relating to a captured measurement variable as a captured sensor current, and
wherein the first evaluation and control unit is configured to evaluate the captured sensor current between a connected energy source of the first and the second energy sources and the sensor element, and the second evaluation and control unit is configured to evaluate the captured sensor current between the sensor element and ground, and
wherein, when the connected energy source fails, the changeover apparatus is configured to connect the first connection of the sensor element to another energy source of the first and the second energy sources.

2. The sensor arrangement as claimed in claim 1, further comprising:
a plurality of the sensor elements respectively arranged at a measurement point of a plurality of measurement points.

3. The sensor arrangement as claimed in claim 2, in wherein:
the measurement points of the plurality of measurement points are each assigned to a corresponding vehicle wheel, and
an associated sensor element of the plurality of sensor elements captures at least a speed and/or rotational speed of the corresponding vehicle wheel.

4. The sensor arrangement (1) as claimed in claim 2, wherein:
the changeover apparatus comprises, at least for each connected sensor element of the plurality of sensor elements, two diodes with a common node to which a supply voltage for a respective sensor element of the plurality of sensor elements connected to the common node is applied, and
a first diode of the two diodes connects the first energy source in a forward direction to the common node, and a second diode of the two diodes connects the second energy source in the forward direction to the common node, such that the supply voltage fed from the first and/or the second energy source is applied to the common node, and a higher voltage prevails.

5. The sensor arrangement as claimed in claim 2, wherein:
the changeover apparatus comprises, at least for each connected sensor element of the plurality of sensor elements, two switching elements with a common node to which a supply voltage for a respective sensor element of the plurality of sensor elements connected to the common node is applied,
a first actuation unit is configured to actuate a first switching element of the two switching elements, which connects the common node to the first energy source, and
a second actuation unit is configured to actuate a second switching element of the two switching elements, which connects the common node to the second energy source.

6. The sensor arrangement as claimed in claim 5, wherein:
the first actuation unit is configured to actuate the first switching element and to connect the common node to the first energy source when if a first voltage detection unit detects that the first energy source provides a first voltage,
the second actuation unit is configured to actuate the second switching element and to connect the common node to the second energy source when a second voltage detection unit detects that the second energy source provides a second voltage,
a priority circuit is configured to enable the actuation of the second switching element, and
the priority circuit enables the actuation of the second switching element when the first voltage detection unit detects that the first energy source does not provide the first voltage.

7. The sensor arrangement as claimed in claim 2, further comprising:
a current processing unit arranged in the first control device and configured to capture a respective captured sensor current between the connected energy source and a respective sensor element of the plurality of sensor elements and to make the respective captured sensor current available to the first evaluation and control unit as a respective measurement current.

8. The sensor arrangement as claimed in claim 7, wherein the second evaluation and control unit is configured to receive and to evaluate the respective captured sensor current directly as a second measurement current.

9. The sensor arrangement as claimed in claim 7, wherein the current processing unit, at least for each connected sensor element of the plurality of sensor elements, comprises a current sensor which is looped into a current path and branches off a current fraction of the respective captured sensor current and forwards the current fraction to the first evaluation and control unit.

10. The sensor arrangement as claimed in claim 9, wherein the first evaluation and control unit has, at least for each connected sensor element, an input protective circuit configured to convert the current fraction of the respective sensor current into a measurement signal corresponding to the respective captured sensor current.

11. The sensor arrangement as claimed in claim 9, wherein the current processing unit, at least for each connected sensor element, comprises a current conditioning unit, which is arranged between the respective current sensor and the first evaluation and control unit and is configured to convert the current fraction of the respective sensor current into an associated measurement current corresponding to the respective captured sensor current.

12. The sensor arrangement as claimed in claim 11, wherein:
the current processing unit comprises a first auxiliary voltage generation unit with an energy store configured to output, at a summation point, a first auxiliary voltage which is lower than the supply voltages of the first and second energy sources, and
the summation point is connected to corresponding sensor current paths of the connected sensor elements between the respective changeover apparatus and the respective current sensor in order to charge the energy store.

13. The sensor arrangement as claimed in claim 12, wherein the summation point is respectively connected to the sensor current paths of the connected sensor elements via a feedback protective diode and a current source.

14. The sensor arrangement as claimed in claim 12, wherein the current processing unit means comprises a second auxiliary voltage generation unit including a DC/DC converter configured to convert the first auxiliary voltage into a considerably lower second auxiliary voltage.

15. The sensor arrangement claimed in claim 14, wherein the second auxiliary voltage supplies the current conditioning unit.

16. The sensor arrangement as claimed in claim 12, wherein the current processing unit comprises an emergency voltage generation unit which, when the supply voltage is missing, is configured to supply the connected sensor element with a third auxiliary voltage which is generated from the sensor current paths of the other connected sensor elements.

17. The sensor arrangement as claimed in claim 16, wherein:
the emergency voltage generation unit means comprises a DC/DC converter configured to convert the second auxiliary voltage into the higher, third auxiliary voltage, a switching apparatus, and a feedback protective diode, and
the switching apparatus is configured to connect the third auxiliary voltage to an affected sensor current path.

18. The sensor arrangement as claimed in claim 7, wherein the current processing unit and the changeover apparatus are combined in one circuit module which is an ASIC module.

19. The sensor arrangement as claimed in claim 2, wherein the sensor elements are respectively connected to the first control device via a two-wire line.

20. The sensor arrangement as claimed claim 2, wherein the first and the second control devices are connected to one another via a multi-core line which, for each of the sensor elements connected to the first control device, comprises a core configured to transmit the respective captured sensor current and a core configured to connect the changeover apparatus to the second energy source.

* * * * *